(12) United States Patent
Yoshizaki

(10) Patent No.: US 11,052,781 B2
(45) Date of Patent: Jul. 6, 2021

(54) NON-CONTACT POWER SUPPLY SYSTEM AND POWER RECEPTION DEVICE

(71) Applicant: TOYOTA JIDOSHA KABUSHIKI KAISHA, Toyota (JP)

(72) Inventor: Yasunao Yoshizaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 407 days.

(21) Appl. No.: 16/111,823

(22) Filed: Aug. 24, 2018

(65) Prior Publication Data
US 2019/0084434 A1 Mar. 21, 2019

(30) Foreign Application Priority Data
Sep. 20, 2017 (JP) .............................. JP2017-180523

(51) Int. Cl.
| | | |
|---|---|---|
| *B60L 53/60* | (2019.01) | |
| *H02J 50/10* | (2016.01) | |
| *B60L 5/00* | (2006.01) | |
| *H02J 50/70* | (2016.01) | |
| *H02J 50/80* | (2016.01) | |
| *B60L 53/12* | (2019.01) | |
| *B60L 53/39* | (2019.01) | |

(52) U.S. Cl.
CPC ............... *B60L 53/60* (2019.02); *B60L 5/005* (2013.01); *B60L 53/12* (2019.02); *B60L 53/39* (2019.02); *H02J 50/10* (2016.02); *H02J 50/70* (2016.02); *H02J 50/80* (2016.02)

(58) Field of Classification Search
CPC .......... B60L 53/60; B60L 53/12; B60L 53/39; B60L 5/005; H02J 50/80; H02J 50/10; H02J 50/70
See application file for complete search history.

(56) References Cited

U.S. PATENT DOCUMENTS

| | | | |
|---|---|---|---|
| 2011/0184842 A1* | 7/2011 | Melen | G06Q 30/04 705/34 |
| 2015/0303714 A1* | 10/2015 | Keeling | B60L 53/122 320/108 |

(Continued)

FOREIGN PATENT DOCUMENTS

| | | |
|---|---|---|
| JP | 2011-160653 A | 8/2011 |
| JP | 2013-051744 A | 3/2013 |

(Continued)

OTHER PUBLICATIONS

Apr. 9, 2019 Office Action issued in Russian Patent Application No. 2018130837.

*Primary Examiner* — Jason C Smith
(74) *Attorney, Agent, or Firm* — Oliff PLC

(57) ABSTRACT

A non-contact power supply system supplies electric power in a non-contact manner from a plurality of power transmission coils disposed on a road to a power receiving coil mounted on a vehicle traveling on the road. The non-contact power supply system includes a first estimation unit configured to estimate a future position of the vehicle, based on a speed of the vehicle, and a specifying unit configured to specify a power transmission coil that has to be in an activated state that is a state of being able to supply electric power to the power receiving coil, among the power transmission coils, based on the estimated future position.

9 Claims, 6 Drawing Sheets

(56) References Cited

U.S. PATENT DOCUMENTS

| | | | |
|---|---|---|---|
| 2016/0023557 A1* | 1/2016 | Dimke | B60L 53/66 |
| | | | 320/108 |
| 2016/0297305 A1 | 10/2016 | Ichikawa | |
| 2019/0084434 A1* | 3/2019 | Yoshizaki | H02J 50/80 |
| 2019/0129420 A1* | 5/2019 | Yoshizaki | B60W 30/16 |
| 2019/0139328 A1* | 5/2019 | Yoshizaki | G07C 5/008 |
| 2019/0147671 A1* | 5/2019 | Yoshizaki | G07C 5/0891 |
| | | | 701/29.1 |

FOREIGN PATENT DOCUMENTS

| | | |
|---|---|---|
| JP | 2014-082805 A | 5/2014 |
| JP | 2015-027149 A | 2/2015 |
| JP | 2015-073380 A | 4/2015 |
| JP | 2015-116084 A | 6/2015 |
| JP | 2017-103938 A | 6/2017 |
| KR | 10-2017-0035920 A | 3/2017 |
| WO | 2011/071344 A2 | 6/2011 |
| WO | 2016/014181 A1 | 1/2016 |

\* cited by examiner

FIG. 5
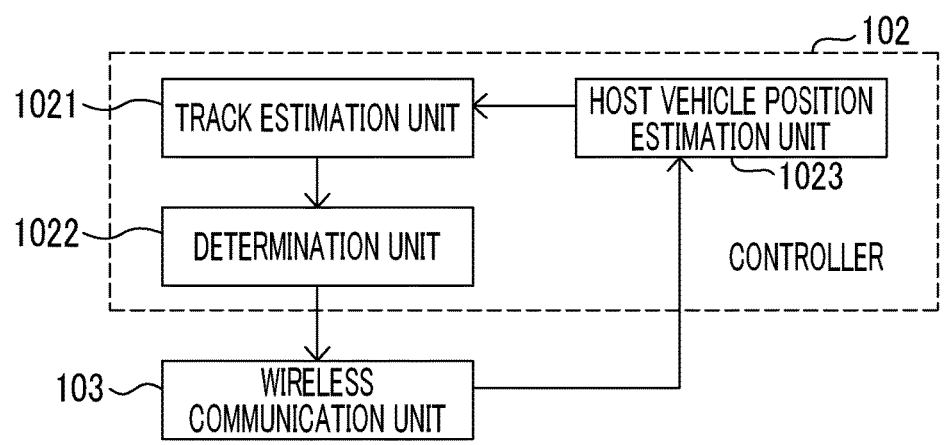
FIG. 6A                FIG. 6B                FIG. 6C
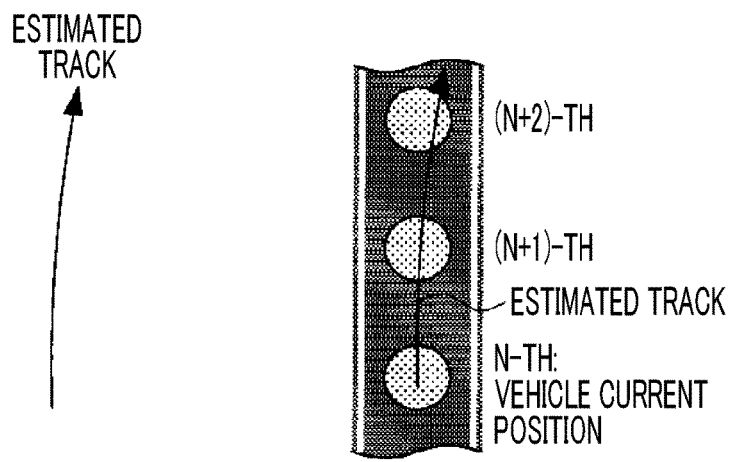
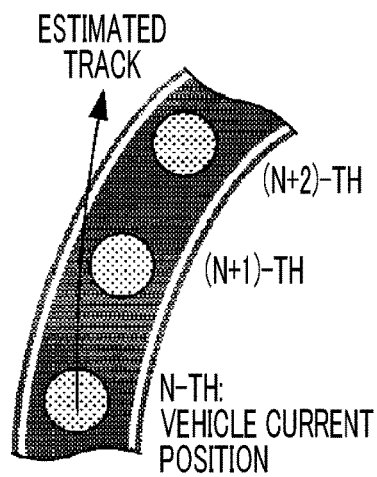

NON-CONTACT POWER SUPPLY SYSTEM AND POWER RECEPTION DEVICE

INCORPORATION BY REFERENCE

The disclosure of Japanese Patent Application No. 2017-180523 filed on Sep. 20, 2017 including the specification, drawings and abstract is incorporated herein by reference in its entirety.

BACKGROUND

1. Technical Field

The disclosure relates to a non-contact power supply system capable of supplying electric power to a traveling vehicle and a power reception device provided in the vehicle.

2. Description of Related Art

As a system of the related art, for example, a system for supplying electric power in a non-contact manner from a power transmission coil provided on a lane to a power receiving coil of a vehicle, the system supplying electric power to a traveling vehicle by activating another system such as a power source circuit controller in a case where a vehicle is detected, has been proposed (refer to Japanese Unexamined Patent Application Publication No. 2015-027149 (JP 2015-027149 A)).

Although it is a technique for supplying electric power in a non-contact manner to a parked vehicle, a system capable of corresponding to each of a plurality of types of coils of a power receiving coil has been proposed (refer to Japanese Unexamined Patent Application Publication No. 2015-116084 (JP 2015-116084 A)).

SUMMARY

In a non-contact power supply system, when a vehicle (that is, a power receiving coil) does not exist, power supply to a power transmission coil is often cut off in consideration of the influence of a leakage magnetic field on, for example, a human body or the like. For this reason, for example, as in the technique described in JP 2015-027149 A, the power supply to the power transmission coil and the cut-off of the power supply are switched based on the detection result of the vehicle.

A certain amount of time (for example, in a range of several tens of milliseconds to several hundreds of milliseconds) is needed from a state where the power supply to the power transmission coil has been cut off to a state where the power transmission coil can supply electric power in a non-contact manner to the power receiving coil. The position of a vehicle that is traveling changes even in a period related to the state change described above. The faster the speed of the vehicle is, the larger the amount of change in a position described above becomes.

In the technique described in JP 2015-027149 A, in a case where the vehicle enters a power supply path, a determination that the vehicle is detected is made, and a power source circuit controller or the like is activated. For this reason, depending on the speed of the vehicle, there is a possibility that the vehicle has passed the power supply path when the power source circuit controller or the like is activated.

The disclosure provides a non-contact power supply system and a power reception device, in which even in a case where a vehicle is traveling relatively fast, it is possible to appropriately supply electric power to the vehicle and to suppress occurrence of a leakage magnetic field.

A first aspect of the disclosure relates to a non-contact power supply system that supplies electric power in a non-contact manner from a plurality of power transmission coils disposed on a road to a power receiving coil mounted on a vehicle traveling on the road. The non-contact power supply system includes: a first estimation unit configured to estimate a future position of the vehicle, based on a speed of the vehicle; and a specifying unit configured to specify a power transmission coil that has to be in an activated state that is a state of being able to supply electric power to the power receiving coil, among the power transmission coils, based on the estimated future position.

In the non-contact power supply system according to the first aspect of the disclosure, the first estimation unit may be configured to estimate a predicted course that is a set of the future positions, based on a movement state of the vehicle including the speed. The specifying unit may be configured to specify a power transmission coil that has to be in the activated state, based on the estimated predicted course.

The non-contact power supply system according to the first aspect of the disclosure may further include a second estimation unit configured to estimate a position of the vehicle on the road, based on a position in a direction in which the road extends, of one power transmission coil that has supplied electric power to the power receiving coil, among the power transmission coils, and an amount of electric power supplied from the one power transmission coil to the power receiving coil. The first estimation unit may estimate the future position, based on the position estimated by the second estimation unit, in addition to the speed.

The non-contact power supply system according to the first aspect of the disclosure may further include a decision unit configured to decide whether or not to make the specified power transmission coil actually be in the activated state, based on a signal indicating an operation intention of a driver of the vehicle.

The non-contact power supply system according to the first aspect of the disclosure may further include a coil controller configured to control each of the power transmission coils such that each of the power transmission coils enters the activated state and control each of the power transmission coils such that each of the power transmission coils enters a standby state that is a state where each of the power transmission coils does not supply electric power to the power receiving coil, after each of the power transmission coils enters the activated state. In a case where there is another vehicle that is different from the vehicle and that travels behind the vehicle on the road, the coil controller may decide whether or not to extend a period in which the power transmission coil that has entered the activated state due to the vehicle maintains the activated state, based on a position of the other vehicle.

A second aspect of the disclosure relates to a power reception device that is mounted on a vehicle in a non-contact power supply system that supplies electric power in a non-contact manner from a plurality of power transmission coils disposed on a road to a power receiving coil mounted on the vehicle traveling on the road. The power reception device includes: a first estimation unit configured to estimate a future position of the vehicle, based on a speed of the vehicle; and a specifying unit configured to specify a power transmission coil that has to be in an activated state that is a state of being able to supply electric power to the power receiving coil, among the power transmission coils, based on the estimated future position.

In the power reception device according to the second aspect of the disclosure, the first estimation unit may be configured to estimate a predicted course that is a set of the future positions, based on a movement state of the vehicle including the speed. The specifying unit may be configured to specify a power transmission coil that has to be in the activated state, based on the estimated predicted course.

The power reception device according to the second aspect of the disclosure may further include a second estimation unit configured to estimate a position of the vehicle on the road, based on a position in a direction in which the road extends, of one power transmission coil that has supplied electric power to the power receiving coil, among the power transmission coils, and an amount of electric power supplied from the one power transmission coil to the power receiving coil. The first estimation unit may estimate the future position, based on the position estimated by the second estimation unit, in addition to the speed.

The power reception device according to the second aspect of the disclosure may further include a decision unit configured to decide whether or not to make the specified power transmission coil actually be in the activated state, based on a signal indicating an operation intention of a driver of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a block diagram showing a configuration of a controller of the power reception device according to the first embodiment;

FIG. 6A is a conceptual diagram showing an example of the concept of determination processing according to the first embodiment;

FIG. 6B is a conceptual diagram showing an example of the concept of determination processing according to the first embodiment;

FIG. 6C is a conceptual diagram showing an example of the concept of determination processing according to the first embodiment;

DETAILED DESCRIPTION OF EMBODIMENTS

Embodiments relating to a non-contact power supply system will be described based on the drawings.

A first embodiment relating to the non-contact power supply system will be described with reference to FIG. 1A to FIG. 9.

Figure 1A:
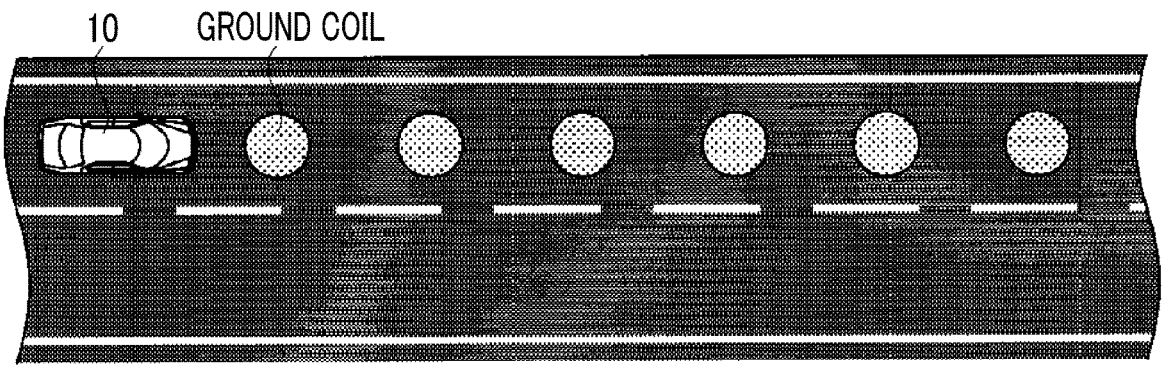
FIG. 1A is a diagram showing an outline of a non-contact power supply system according to a first embodiment.
Figure 1B:
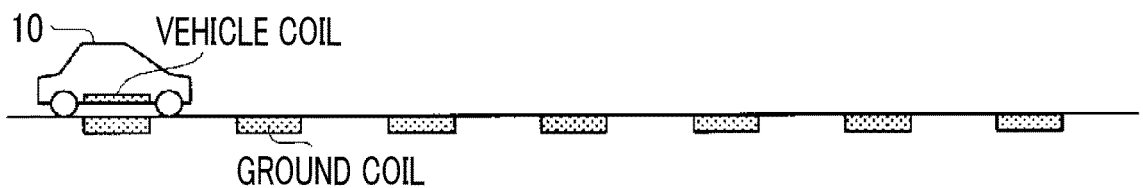
FIG. 1B is a diagram showing an outline of the non-contact power supply system according to the first embodiment.
Figure 2:
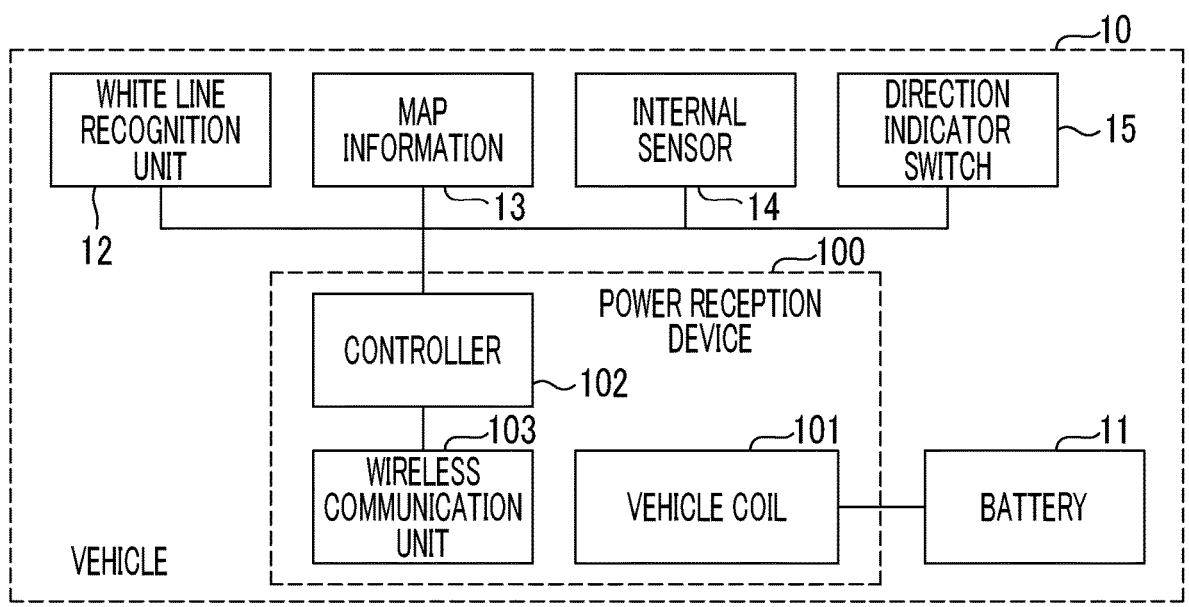
FIG. 2 is a block diagram showing a configuration of a power reception device according to the first embodiment.
Figure 3:
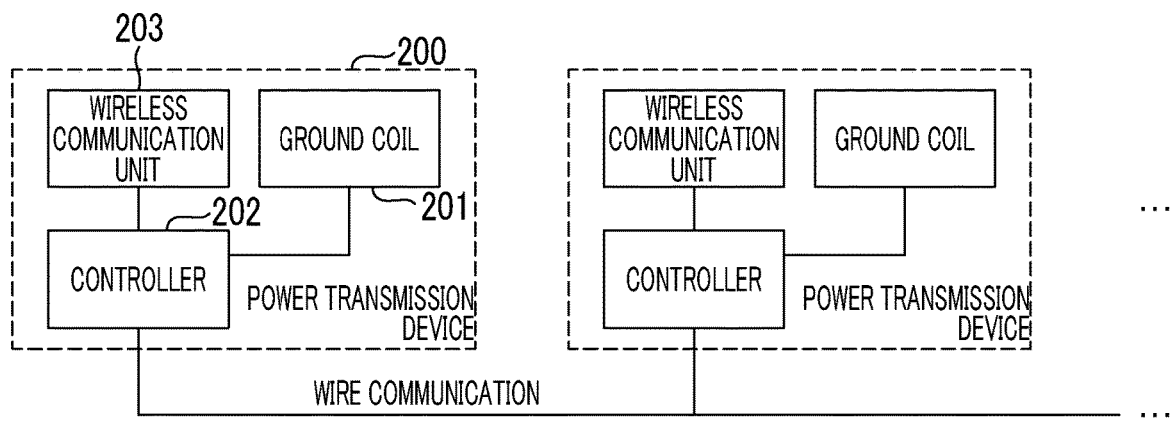
FIG. 3 is a block diagram showing a configuration of a power transmission device according to the first embodiment.

The configuration of the non-contact power supply system according to the first embodiment will be described with reference to FIG. 1A to FIG. 3. FIG. 1A and FIG. 1B are diagrams showing an outline of the non-contact power supply system according to the first embodiment. FIG. 2 is a block diagram showing the configuration of a power reception device according to the first embodiment. FIG. 3 is a block diagram showing the configuration of a power transmission device according to the first embodiment.

The non-contact power supply system includes a plurality of ground coils arranged along a direction in which a road extends, as shown in FIG. 1A and FIG. 1B. A vehicle coil is mounted on a vehicle 10 corresponding to the non-contact power supply system. In a case where the vehicle 10 travels on a road (or a lane) on which the ground coils are arranged, electric power is supplied in a non-contact manner from the ground coil that faces the vehicle coil to the vehicle coil.

The vehicle 10 will be described with reference to FIG. 2. In FIG. 2, the vehicle 10 is configured to include a battery 11, a white line recognition unit 12, map information 13, an internal sensor 14, a direction indicator switch 15, and a power reception device 100. The power reception device 100 is configured to include a vehicle coil 101, a controller 102, and a wireless communication unit 103.

The battery 11 is connected to the vehicle coil 101. The battery 11 is configured to be chargeable by the electric power from the vehicle coil 101. The white line recognition unit 12 recognizes a white line drawn on the road on which the vehicle 10 is traveling, based on a captured image of the road in front of the vehicle 10. Since the existing technique can be applied to the technique relating to white line recognition, the detailed description thereof will be omitted. The map information 13 includes at least information relating to the shape of the road (for example, the curvature of a curve, or the like) and information indicating the position of each of the ground coils. The internal sensor 14 includes, for example, a speed sensor, an acceleration sensor, a yaw rate sensor, a steering angle sensor, and the like. The controller 102 of the power reception device 100 performs control relating to the charging of the battery 11 through the vehicle coil 101 (the details thereof will be described later). The wireless communication unit 103 is configured to be capable of performing mutual wireless communication with a wireless communication unit 203 of a power transmission device 200 (described later).

The power transmission device that is provided with a ground coil will be described with reference to FIG. 3. In FIG. 3, the power transmission device 200 is configured to include a ground coil 201, a controller 202, and the wireless communication unit 203. The power transmission device 200 is configured to be capable of performing wire communication with another power transmission device 200 by a communication line such as an electric wire or an optical fiber, for example. In the first embodiment, a unique number is allocated to each of the power transmission devices 200 such that each of the power transmission devices 200 can be identified.

Figure 4:
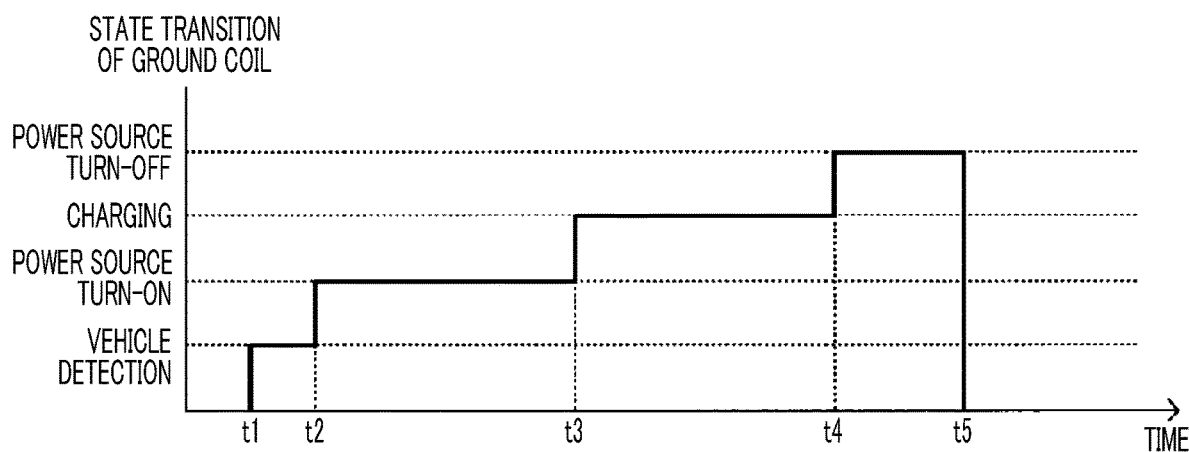
FIG. 4 is a graph showing an example of a state transition of a ground coil according to the first embodiment.

Here, a state transition of the ground coil 201 will be described with reference to FIG. 4. FIG. 4 is a graph showing an example of the state transition of the ground coil according to the first embodiment. When the vehicle 10 is detected (specifically, for example, when the wireless communication unit 203 (refer to FIG. 3) receives a signal transmitted from the wireless communication unit 103 (refer to FIG. 2)) at time t1 in FIG. 4, at time t2, the controller 202 starts the turn-on of a power source (not shown) that supplies electric power to the ground coil 201. Thereafter, at time t3 (at this time, the vehicle 10 is located above the ground coil 201), the controller 202 controls the ground coil 201 (strictly speaking, a power transmission circuit that includes the ground coil 201) so as to supply electric power to the vehicle coil 101. As a result, the battery 11 of the vehicle 10 is charged. When a power supply (charging) period ends at time t4, the controller 202 starts the turn-off of the power source that supplies electric power to the ground coil 201. When the turn-off of the power source is ended at time t5, the state of the ground coil 201 returns to the state before vehicle detection. The power supply period changes according to the speed of the vehicle 10.

The step from time t2 to time t3 in FIG. 4 is hereinafter appropriately referred to as a "power source turn-on step". The step from time t3 to time t4 in FIG. 4 is hereinafter appropriately referred to as a "charging step". The step from time t4 to time t5 in FIG. 4 is hereinafter appropriately referred to as a "power source turn-off step".

Figure 7:
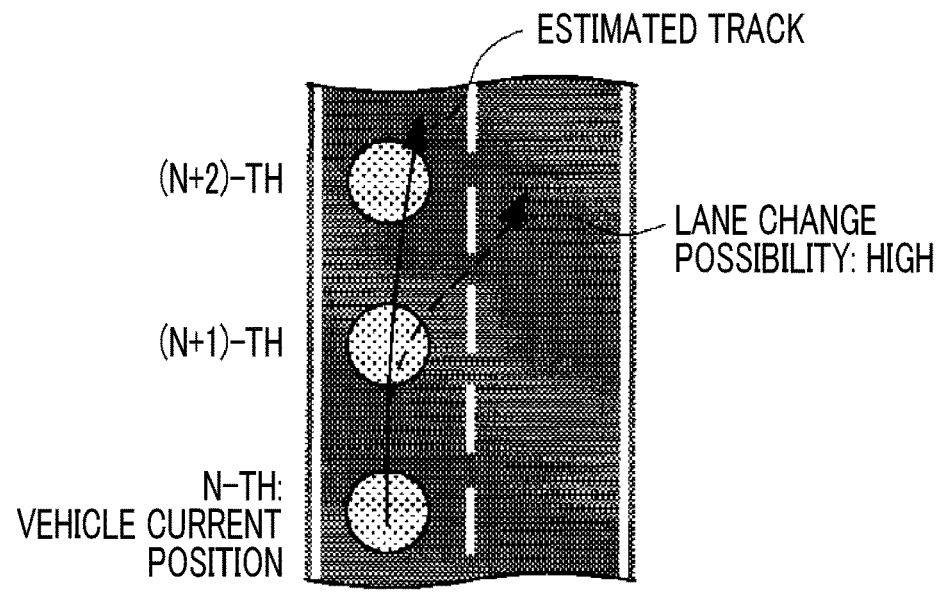
FIG. 7 is a conceptual diagram showing another example of the concept of the determination processing according to the first embodiment.
Figure 8:
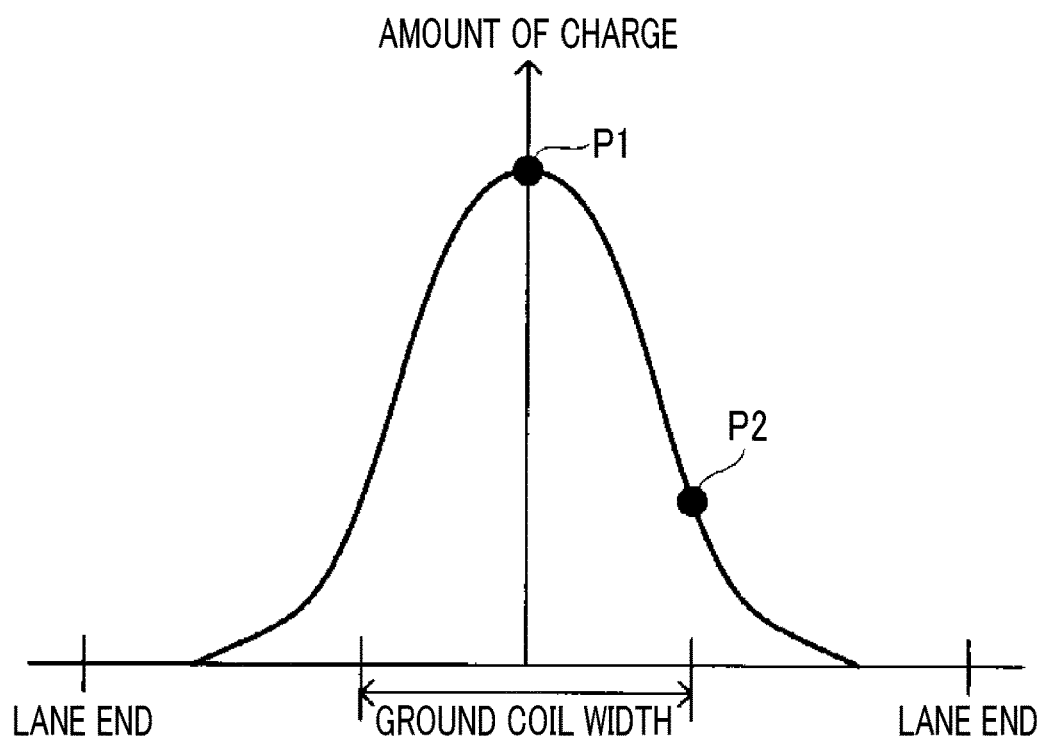
FIG. 8 is a graph showing an example of a change in the amount of charge in a width direction of a road.
Figure 9:
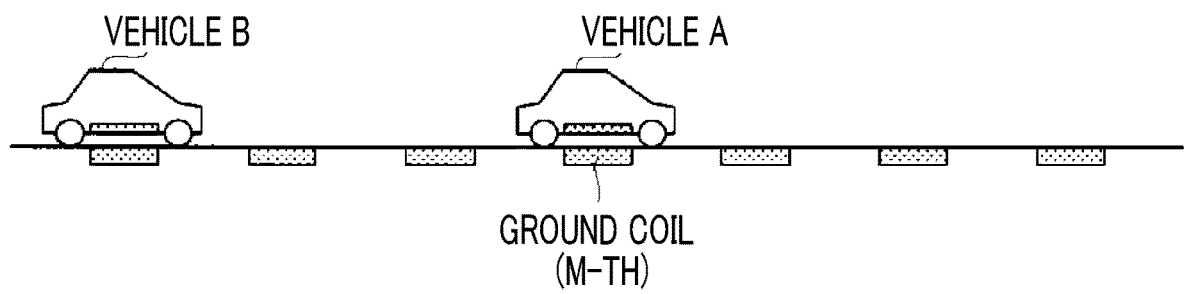
FIG. 9 is a diagram showing an example of a traveling situation of a vehicle.

The operation of the non-contact power supply system configured as described above will be described with reference to FIG. 5 to FIG. 9. FIG. 5 is a block diagram showing the configuration of the controller of the power reception device according to the first embodiment. FIG. 6A to FIG. 6C are conceptual diagrams showing an example of the concept of determination processing according to the first embodiment. FIG. 7 is a conceptual diagram showing another example of the concept of the determination processing according to the first embodiment. FIG. 8 is a graph showing an example of a change in the amount of charge in a width direction of a road. FIG. 9 is a diagram showing an example of a traveling situation of a vehicle.

In the non-contact power supply system according to the first embodiment, a signal indicating a command to the power transmission device 200 is transmitted from the power reception device 100 provided in the vehicle 10. The power transmission device 200 supplies electric power from the ground coil 201 to the vehicle coil 101 in response to the signal.

The controller 102 of the power reception device 100 is configured to include a track estimation unit 1021, a determination unit 1022, and a host vehicle position estimation unit 1023, as processing blocks that are logically realized or processing circuits that are physically realized, in the controller 102, as shown in FIG. 5.

Track estimation processing is explained. The track estimation unit 1021 estimates a track (in other words, a predicted course) of the vehicle 10 from the present time to a predetermined time later (for example, a few seconds later), which is a set of future positions of the vehicle 10, based on the output (in particular, a vehicle speed, acceleration/deceleration, a yaw rate, or a steering angle) of the internal sensor 14 and position information indicating the current position of the vehicle 10. Since the existing technique can be applied to a track estimation method, the detailed description thereof will be omitted. With respect to the position information, refer to "host vehicle position estimation processing" that will be described later.

Determination processing is explained. The determination unit 1022 determines (decides) the power transmission device 200 that has to be in a state of being able to supply electric power from the ground coil 201 to the vehicle coil 101 (hereinafter appropriately referred to as an "activated state"), based on the track estimated by the track estimation unit 1021. Here, the "activated state" means a state where the power source is turned on by the "power source turn-on step" described above.

Specifically, first, the determination unit 1022 acquires road route information indicating the shape of the road on which the vehicle 10 is currently traveling, based on the result of the white line recognition by the white line recognition unit 12 and the map information 13. In a case where the ground coil 201 is present around the vehicle 10, information indicating the position of the ground coil 201 is also included in the road route information.

The determination unit 1022 compares the track estimated by the track estimation unit 1021 with the road route information. For example, it is assumed that the estimated track is a track as shown in FIG. 6A. As shown in FIG. 6B, in a case where the shape of the road indicated by the road route information is a straight road, the determination unit 1022 determines that the estimated track is a track along the shape of the road.

As shown in FIG. 6B, when it is assumed that the current position of the vehicle 10 is the position of the N-th ground coil 201, the determination unit 1022 specifies the power transmission devices 200 that are respectively provided with the (N+1)-th and (N+2)-th ground coils 201 overlapping the estimated track, as candidates for the power transmission device 200 that has to be in the activated state. At this time, the determination unit 1022 specifies the candidates in consideration of, for example, the error of the estimated track caused by the error of each of the position information and the output of the internal sensor 14.

On the other hand, as shown in FIG. 6C, in a case where the shape of the road indicated by the road route information is a curved road, the determination unit 1022 determines that the estimated track is not a track along the shape of the road. In the case described above, the power transmission device 200 that has to be in the activated state is not determined based on the track estimated this time.

After the candidates for the power transmission device 200 that has to be in the activated state are specified, the determination unit 1022 determines whether or not there is a possibility that the actual course of the vehicle 10 deviates from the estimated track, based on the ON/OFF state of the direction indicator switch 15, for example.

In a case where the direction indicator switch 15 is in an ON state, for example, as shown in FIG. 7, a possibility that an operation related to a lane change is performed by a driver of the vehicle 10 is relatively high. In the case described above, the determination unit 1022 estimates a position at which the lane change is started, based on, for example, a vehicle speed, a predicted time after the direction indicator switch 15 enters the ON state and until the operation related to the lane change is actually started, or the like. The determination unit 1022 determines the power transmission device 200 that has to be actually in the activated state, among the candidates for the power transmission device 200 that has to be in the activated state, based on the estimated position. In the example shown in FIG. 7, the determination unit 1022 determines that the power transmission device 200 having the (N+1)-th ground coil 201 has to be in the activated state.

On the other hand, in a case where the direction indicator switch 15 is in an OFF state, a possibility that an operation related to a lane change is performed by the driver of the vehicle 10 is relatively low. In the case described above, the determination unit 1022 determines that a possibility that the vehicle 10 travels along the estimated track is relatively high, and determines the power transmission device 200 that has to be actually in the activated state, among the candidates for the power transmission device 200 that has to be in the activated state. In the example shown in FIG. 7, the determination unit 1022 determines that the power transmission devices 200 having the (N+1)-th and (N+2)-th ground coil 201 have to be in the activated state.

The determination unit 1022 transmits a ground coil ON signal, which is a signal indicating a command to perform non-contact power supply to the vehicle 10, to the power transmission device 200 that has to be actually in the activated state, through the wireless communication unit 103. Typically, the ground coil ON signal is received by the wireless communication unit 203 of the power transmission device 200 closest to the vehicle 10 and is transmitted to the power transmission device 200 that has to be actually in the activated state, by wire communication between the power transmission devices 200.

The determination unit 1022 may determine whether or not there is a possibility that the actual course of the vehicle 10 deviates from the estimated track, based on, for example, (i) the amount of change in acceleration or steering angle based on the output of the internal sensor 14, or (ii) the amount of change in the inter-vehicle distance between the vehicle 10 and the vehicle that is traveling immediately in front of the vehicle 10, based on the output of a periphery recognition sensor (not shown), in addition to or instead of the ON/OFF state of the direction indicator switch 15.

In a case where the amount of change in acceleration is relatively large, there is a possibility that the actual position of the vehicle 10 deviates relatively greatly in a front-rear direction of the vehicle 10 from the future position of the vehicle 10, which is shown by the estimated track. In a case where the amount of change in steering angle is relatively large, there is a possibility that the actual position of the vehicle 10 deviates relatively greatly in the width direction (that is, a right-left direction) of the vehicle 10 from the future position of the vehicle 10, which is shown by the estimated track. In a case where the inter-vehicle distance becomes shorter, a possibility that lane change is performed in order to dodge the vehicle that is traveling immediately in front of the vehicle 10 is relatively high.

Host vehicle position estimation processing is described. The electric power that is supplied from the ground coil 201 to the vehicle coil 101 changes according to the amount of deviation between the vehicle coil 101 and the ground coil 201 in the width direction of the vehicle 10 when viewed from above the vehicle 10 in a plan view. For example, in FIG. 8, in a case where the center of the vehicle coil 101 is at a position P1, the electric power (in FIG. 8, the "amount of charge") that is supplied from the ground coil 201 to the vehicle coil 101 becomes the maximum. On the other hand, in a case where the center of the vehicle coil 101 is at a position P2, the electric power that is supplied from the ground coil 201 to the vehicle coil 101 becomes significantly smaller than in a case where the center of the vehicle coil 101 is at the position P1.

The distance in a height direction between the ground coil 201 and the vehicle coil 101 is known from the vehicle height of the vehicle 10. At the time of the non-contact power supply from the ground coil 201 to the vehicle coil 101, the electric power that is supplied to the ground coil 201 is typically constant. For this reason, the relationship between the center position of the vehicle coil 101 in the width direction of the road and the amount of electric power that is supplied to the vehicle coil 101 can be relatively easily obtained.

The host vehicle position estimation unit 1023 estimates the position of the vehicle 10 in the width direction of the road, based on the relationship described above and the amount of electric power that is supplied to the vehicle coil 101 (in other words, the amount of electric power received by the vehicle coil 101). The host vehicle position estimation unit 1023 estimates the position of the vehicle 10 in the direction in which the road extends, based on the number allocated to the power transmission device 200 that is supplying electric power to the vehicle coil 101 and the information indicating the position of the ground coil 201, which is included in the map information 13.

The host vehicle position estimation unit 1023 outputs the position of the vehicle 10 estimated as described above, instead of the position information obtained by a global positioning system (GPS), for example, to the track estimation unit 1021. Alternatively, the host vehicle position estimation unit 1023 corrects the position information obtained by, for example, the GPS, based on the position of the vehicle 10 estimated as described above, and outputs the corrected position information to the track estimation unit 1021. The host vehicle position estimation processing described above is executed during a period in which the non-contact power supply is being performed on the vehicle 10.

Operation of power transmission device is described. The controller 202 of the power transmission device 200 transits the state of the ground coil 201 in the order of the power source turn-on step, the charging step, and the power source turn-off step, as shown in FIG. 4, with the reception of the ground coil ON signal as a trigger. As a result, in the charging step, electric power is supplied from the ground coil 201 to the vehicle coil 101 of the vehicle 10 (that is, the non-contact power supply is performed on the vehicle 10).

Incidentally, as shown in FIG. 9, in a case where a vehicle B as another example of the vehicle 10 is traveling behind a vehicle A as an example of the vehicle 10, the power transmission device 200 having, for example, the M-th ground coil 201 receives the ground coil ON signal from the power reception device 100 of the vehicle A and the ground coil ON signal from the power reception device 100 of the vehicle B. In the case described above, depending on the distance between the vehicle A and the vehicle B, there is a possibility that the non-contact power supply to the vehicle B is not appropriately performed when the power source that supplies electric power to the ground coil 201 is turned on again for the non-contact power supply to the vehicle B after the power source that supplies electric power to the ground coil 201 is turned off, after the vehicle A has passed through the M-th ground coil 201.

Therefore, the controller 202 of the power transmission device 200 performs an overlap determination to determine whether or not to maintain the charging step, based on the position of each of the vehicle A and the vehicle B. In a case where in the overlap determination, a determination that the charging step is maintained is made, the controller 202 maintains the charging step until the vehicle B passes through the ground coil 201. The position of each of the vehicle A and the vehicle B may be estimated, for example, from the position of the power transmission device 200 provided with the wireless communication unit 203 that is performing wireless communication with each of the wireless communication unit 103 of the power reception device 100 of the vehicle A and the wireless communication unit 103 of the power reception device 100 of the vehicle B.

The controller 202 of the power transmission device 200 performs the transition of the state of the ground coil 201 in the order of the power source turn-on step, the charging step, and the power source turn-off step with the reception of the ground coil ON signal from the power reception device 100 provided in the vehicle 10 as a trigger (refer to FIG. 4). Since electric power is not supplied to the ground coil 201 during a period in which the non-contact power supply is not performed on the vehicle 10. In other words, electric power is supplied to the ground coil 201 solely during a period in which the non-contact power supply is performed on the vehicle 10, it is possible to suppress occurrence of a leakage magnetic field.

A certain amount of time (for example, in a range of several tens of milliseconds to several hundreds of milliseconds) is needed for the power source turn-on step. For example, in a case where the vehicle 10 is traveling at a speed of 100 kilometers per hour, the vehicle 10 advances about 2.78 meters during 100 milliseconds. For this reason, when the ground coil ON signal is not transmitted such that the power source is turned on before the vehicle 10 reaches the position of the ground coil 201 (that is, such that the power transmission device 200 enters the activated state), there is a possibility that the non-contact power supply to the vehicle 10 is not performed appropriately. On the other hand, the future position of the vehicle 10 is affected by, for example, the operation of the driver of the vehicle 10, or the like.

Therefore, in the first embodiment, the track estimation unit 1021 of the controller 102 of the power reception device 100 estimates the track of the vehicle 10 from the present time to a predetermined time later, based on the output of the internal sensor 14 and the position information indicating the current position of the vehicle 10. In the first embodiment, since the output of the internal sensor 14 indicating the movement state of the vehicle 10 is used for the estimation of the track of the vehicle 10, it is possible to estimate a track having relatively high reliability.

The determination unit 1022 of the controller 102 specifies the candidates for the power transmission device 200 that has to be in the activated state, by comparing the estimated track with the road route information based on the result of the white line recognition and the map information. As described above, by comparing the estimated track with the road route information, it is possible to determine whether or not the estimated track is a track along the road shape. For this reason, it is possible to suppress an erroneous power transmission device 200 from being specified as a candidate.

The determination unit 1022 further determines the power transmission device 200 that has to be actually in the activated state, among the specified candidates, by determining whether or not there is a possibility that the actual course of the vehicle 10 deviates from the estimated track, based on, for example, the ON/OFF state of the direction indicator switch 15, or the like. As described above, a signal indicating the operation intention of the driver of the vehicle 10, such as the ON/OFF state of the direction indicator switch 15, is taken into consideration. For this reason, even in a case where a possibility that the actual course of the vehicle 10 deviates from the estimated track is relatively high, it is possible to appropriately determine the power transmission device 200 that has to be actually in the activated state.

The range in which the wireless communication unit 103 of the power reception device 100 and the wireless communication unit 203 of the power transmission device 200 can wirelessly communicate with each other is, for example, a range of several tens of meters to hundred meters. For this reason, even in a case where the vehicle 10 is traveling at a speed of 100 kilometers per hour, it is possible to transmit the ground coil ON signal from the power reception device 100 to the power transmission device 200 provided with the ground coil 201, about 1 second before the vehicle 10 reaches the position of the ground coil 201 that performs the non-contact power supply on the vehicle 10. That is, in the non-contact power supply system, it is possible to transmit the ground coil ON signal to the power transmission device 200 provided with the ground coil 201 such that the power source is turned on before the vehicle 10 reaches the position of the ground coil 201.

As a result of the above, according to the non-contact power supply system, even in a case where the vehicle 10 is traveling at a relatively high speed, it is possible to appropriately perform the non-contact power supply to the vehicle 10. In addition, since the power transmission device 200, which has not to be originally in the activated state, is suppressed from entering the activated state, it is possible to suppress the occurrence of the leakage magnetic field.

The host vehicle position estimation processing described above is executed, so that it is possible to further improve the accuracy of the position information of the vehicle 10 than the accuracy of the position information obtained solely by the GPS, for example. For this reason, it is possible to improve the reliability of the track that is estimated in the track estimation processing described above.

The overlap determination described above is performed by the power transmission device 200, so that it is possible to prevent the chance of non-contact power supply from being reduced due to turn-off of the power source and re-turn-on of the power source.

In the first embodiment described above, the track of the vehicle 10 is estimated by the track estimation processing, and the power transmission device 200 that has to be in the activated state is determined based on the estimated track or the like. For modification example, in a case where the ground coils 201 are arranged on a straight road having one lane on one side (that is, in a case where a possibility that there is no a lane change or a relatively large steering operation is high), a configuration may be made such that the future position of the vehicle 10 is estimated from the speed of the vehicle 10 instead of the track estimation processing and the ground coil 201 that has to be in the activated state is determined based on the estimated future position.

Figure 10:
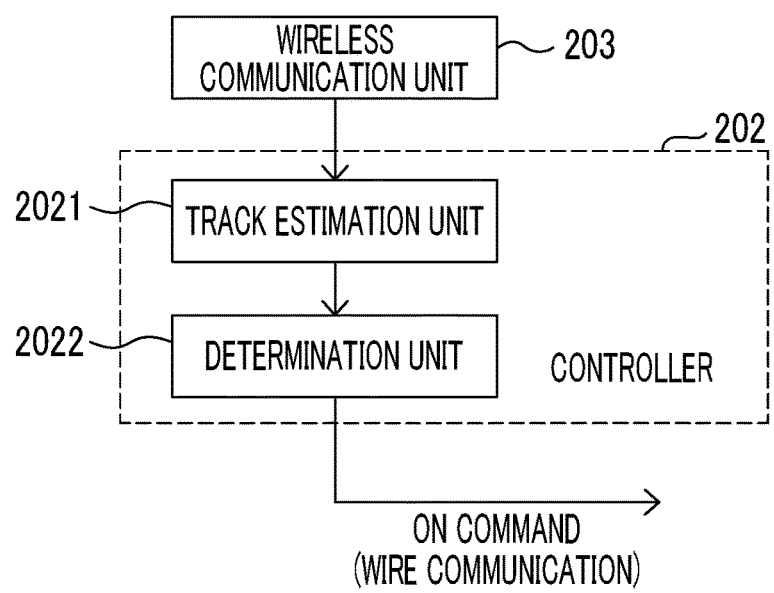
FIG. 10 is a block diagram showing a configuration of a controller of a power transmission device according to a second embodiment.

A second embodiment of the non-contact power supply system will be described with reference to FIG. 10. The second embodiment is the same as the first embodiment except that the track estimation processing described above and the like are performed in the power transmission device. Therefore, in the second embodiment, the description overlapping that in the first embodiment is omitted, the common parts on the drawing are denoted by the same reference numerals, and solely basically different points will be described with reference to FIG. 10. FIG. 10 is a block diagram showing the configuration of a controller of a power transmission device according to the second embodiment.

In the non-contact power supply system according to the second embodiment, a signal indicating the movement state of the vehicle 10 and the like are transmitted from the power reception device 100 provided in the vehicle 10 to any one of the power transmission devices 200. The power transmission device 200 that has received the signal estimates the track of the vehicle 10 and determines (decides) the power transmission device 200 that has to be in the activated state.

The controller 202 of the power transmission device 200 is configured to include a track estimation unit 2021 and a determination unit 2022, as processing blocks that are logically realized or processing circuits that are physically realized, in the controller 202, as shown in FIG. 10.

Track estimation processing is explained. The controller 102 of the power reception device 100 transmits the output (in particular, a vehicle speed, acceleration/deceleration, a yaw rate, or a steering angle) of the internal sensor 14 and position information indicating the current position of the vehicle 10 to the power transmission device 200. The track estimation unit 2021 of the controller 202 of the power transmission device 200 estimates the track of the vehicle 10 from the present time to a predetermined time later, based on the output of the internal sensor 14 and the position information indicating the current position of the vehicle 10 and in consideration of a time lag caused by communication.

Determination processing is explained. The controller 102 further transmits the road route information based on the result of the white line recognition by the white line recognition unit 12 and the map information 13, the signal indicating the ON/OFF state of the direction indicator switch 15, or the like to the power transmission device 200. The determination unit 2022 of the controller 202 determines (decides) the power transmission device 200 that has to be in the activated state, based on the track estimated by the track estimation unit 2021 and the road route information, and furthermore, based on the signal indicating the ON/OFF state of the direction indicator switch 15, or the like. Then, the determination unit 2022 transmits the ground coil ON signal to the power transmission device 200 determined to have to be in the activated state, with wire communication.

Figure 11:
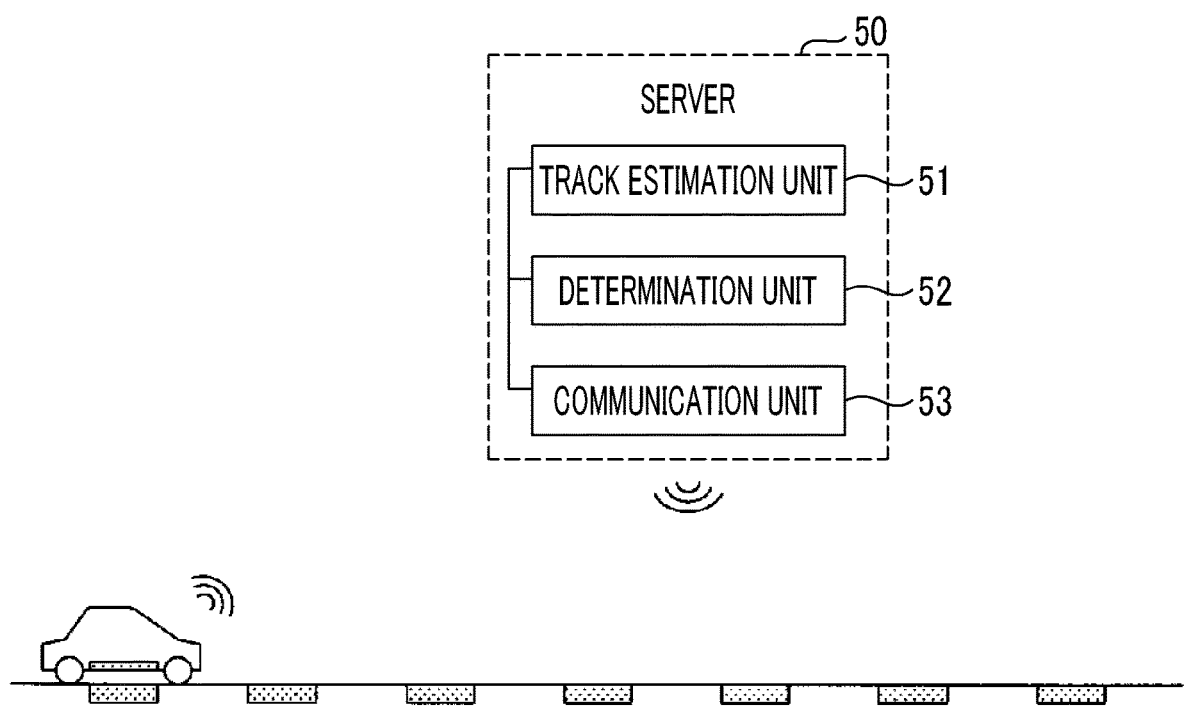
FIG. 11 is a diagram showing an outline of a non-contact power supply system according to a third embodiment.

A third embodiment of the non-contact power supply system will be described with reference to FIG. 11. The third embodiment is the same as the first embodiment except that the track estimation processing described above and the like are performed by a server on a network. Therefore, in the third embodiment, the description overlapping that in the first embodiment is omitted, the common parts on the drawing are denoted by the same reference numerals, and solely basically different points will be described with reference to FIG. 11. FIG. 11 is a diagram showing an outline of the non-contact power supply system according to the third embodiment.

The non-contact power supply system according to the third embodiment is configured to include a server 50 on a network such as the internet, for example. The server 50 is configured to include a track estimation unit 51, a determination unit 52, and a communication unit 53.

In the non-contact power supply system, a signal indicating the movement state of the vehicle 10 and the like are transmitted from the power reception device 100 provided in the vehicle 10 to the server 50 through the network. The server 50 that has received the signal estimates the track of the vehicle 10 and determines (decides) the power transmission device 200 that has to be in the activated state.

Track estimation processing is explained. The controller 102 of the power reception device 100 transmits the output (in particular, a vehicle speed, acceleration/deceleration, a yaw rate, or a steering angle) of the internal sensor 14 and position information indicating the current position of the vehicle 10 to the server 50.

The track estimation unit 51 of the server 50 estimates the track of the vehicle 10 from the present time to a predetermined time later, based on the output of the internal sensor 14 and the position information indicating the current position of the vehicle 10 and in consideration of a time lag caused by communication.

Determination processing is explained. The controller 102 further transmits the road route information based on the result of the white line recognition by the white line recognition unit 12 and the map information 13, the signal indicating the ON/OFF state of the direction indicator switch 15, or the like to the server 50. The determination unit 52 determines (decides) the power transmission device 200 that has to be in the activated state, based on the track estimated by the track estimation unit 51 and the road route information, and furthermore, based on the signal indicating the ON/OFF state of the direction indicator switch 15, or the like. Then, the determination unit 52 transmits the ground coil ON signal to the power transmission device 200 determined to have to be in the activated state, through the communication unit 53.

Various aspects of the disclosure, which are derived from the embodiments and the modification example described above, will be described below.

The non-contact power supply system according to a first aspect of the disclosure is a non-contact power supply system that supplies electric power in a non-contact manner from a plurality of power transmission coils disposed on a road to a power receiving coil mounted on a vehicle traveling on the road, and includes a first estimation unit configured to estimates a future position of the vehicle, based on a speed of the vehicle, and a specifying unit configured to specify a power transmission coil that has to be in an activated state that is a state of being able to supply electric power to the power receiving coil, among the power transmission coils, based on the estimated future position.

In the embodiments of the disclosure, the "track estimation units 1021, 2021, 51" are examples of the first estimation unit, the "determination units 1022, 2022, 52" are examples of the specifying unit, the "vehicle coil 101" is an example of the power receiving coil, and the "ground coil 201" is an example of the power transmission coil.

In the non-contact power supply system, the future position of the vehicle is estimated based on the speed of the vehicle and the power transmission coil that has to be in the activated state is specified. For this reason, the power transmission coil corresponding to the future position of the vehicle enters the activated state, and on the other hand, the power transmission coil that does not correspond to the future position of the vehicle does not enter the activated state. In addition, the speed of the vehicle is taken into consideration, and therefore, even in a case where the vehicle is traveling relatively fast, it is possible to appropriately specify the power transmission coil that has to be in the activated state.

Therefore, according to the non-contact power supply system, even in a case where the vehicle is traveling relatively fast, it is possible to appropriately supply electric power to the vehicle and to suppress the occurrence of the leakage magnetic field.

Further, the "speed of the vehicle" may be a speed directly measured by, for example, a vehicle speed sensor or the like, or may be a speed indirectly obtained from, for example, the acceleration of the vehicle or the position of the vehicle.

In the non-contact power supply system according to the first aspect of the disclosure, the first estimation unit may estimate a predicted course that is a set of the future positions, based on a movement state of the vehicle including the speed. The specifying unit may specify a power transmission coil that has to be in the activated state, based on the estimated predicted course. According to the first aspect of the disclosure, it is possible to suitably specify the power transmission coil that has to be in the activated state.

The non-contact power supply system according to the first aspect of the disclosure may further include a second estimation unit configured to estimate a position of the vehicle on the road, based on a position in a direction in which the road extends, of one power transmission coil that has supplied electric power to the power receiving coil, among the power transmission coils, and the amount of electric power supplied from the one power transmission coil to the power receiving coil. The first estimation unit may estimate the future position, based on the position estimated by the second estimation unit, in addition to the speed. According to the first aspect of the disclosure, it is possible to estimate the position of the vehicle with relatively high accuracy. As a result, it is possible to improve the accuracy of the estimation by the first estimation unit. In the embodiments of the disclosure, the "host vehicle position estimation unit 1023" is an example of the second estimation unit.

The non-contact power supply system according to the first aspect of the disclosure may further include a decision unit configured to decide whether or not to make the specified power transmission coil actually be in the activated state, based on a signal indicating an operation intention of the driver of the vehicle. According to the aspect described above, it is possible to decide the power transmission coil that has to be in the activated state, in consideration of a possibility that the position of the vehicle deviates from the estimated future position.

In the embodiments of the disclosure, the "determination units 1022, 2022, 52" are examples of the decision unit. The "ON/OFF state of the direction indicator switch 15", the "acceleration being relatively high", the "steering angle being relatively large", and the "inter-vehicle distance becoming shorter" are examples of the "operation intention of the driver".

The non-contact power supply system according to the first aspect of the disclosure may further include a coil controller configured to control each of the power transmission coils so as to enter the activated state and control each of the power transmission coils so as to enter a standby state that is a state where electric power is not supplied to the power receiving coil, after each of the power transmission coils enters the activated state. In a case where there is another vehicle different from the vehicle and traveling behind the vehicle on the road, the coil controller may decide whether or not to extend a period in which the power transmission coil that has entered the activated state due to the vehicle maintains the activated state, based on the position of another vehicle. According to the first aspect of the disclosure, it is possible to suppress a decrease in opportunity in which the non-contact power supply to another vehicle is performed, due to switching between the standby state and the activated state of the ground coil. In the embodiments of the disclosure, the "controller 202" is an example of the coil controller.

The power reception device according to a second aspect of the disclosure is a power reception device that is mounted on a vehicle, in a non-contact power supply system that supplies electric power in a non-contact manner from a plurality of power transmission coils disposed on a road to a power receiving coil mounted on a vehicle traveling on the road, and includes a first estimation unit configured to estimate a future position of the vehicle, based on a speed of the vehicle, and a specifying unit configured to specify a power transmission coil that has to be in an activated state that is a state of being able to supply electric power to the power receiving coil, among the power transmission coils, based on the estimated future position.

According to the power reception device, similarly to the non-contact power supply system according to the first aspect of the disclosure described above, even in a case where the vehicle is traveling relatively fast, it is possible to appropriately supply electric power to the vehicle and to suppress the occurrence of the leakage magnetic field.

In the power reception device according to the second aspect of the disclosure, the first estimation unit may estimate a predicted course that is a set of the future positions, based on the movement state of the vehicle including the speed. The specifying unit may specify the power transmission coil that has to be in the activated state, based on the estimated predicted course. According to the second aspect of the disclosure, it is possible to suitably specify the power transmission coil that has to be in the activated state.

The power reception device according to the second aspect of the disclosure may further include a second estimation unit configured to estimate a position of the vehicle on the road, based on the position in a direction in which the road extends, of one power transmission coil that has supplied electric power to the power receiving coil, among the power transmission coils, and the amount of electric power supplied from the one power transmission coil to the power receiving coil. The first estimation unit may estimate the future position, based on the position estimated by the second estimation unit, in addition to the speed. According to the second aspect of the disclosure, it is possible to estimate the position of the vehicle with relatively high accuracy. As a result, it is possible to improve the accuracy of the estimation by the first estimation unit.

The power reception device according to the second aspect of the disclosure may further include a decision unit configured to decide whether or not to make the specified power transmission coil actually be in the activated state, based on a signal indicating an operation intention of the driver of the vehicle. According to the second aspect of the disclosure, it is possible to decide the power transmission coil that has to be in the activated state, in consideration of a possibility that the position of the vehicle deviates from the estimated future position.

The disclosure is not limited to the embodiments described above and can be appropriately changed within a scope that is not contrary to the gist or idea of the disclosure, which can be read from the claims and the entire specification. Further, a non-contact power supply system and a power reception device, which have a change as described above, are also included in the technical scope of the disclosure.

What is claimed is:
1. A non-contact power supply system that supplies electric power in a non-contact manner from a plurality of power transmission coils disposed on a road to a power receiving coil mounted on a vehicle traveling on the road, the non-contact power supply system comprising:
   the plurality of power transmission coils;
   a first estimation unit configured to estimate a future position of the vehicle, based on a speed of the vehicle;

a specifying unit configured to specify a power transmission coil that has to be in an activated state that is a state of being able to supply electric power to the power receiving coil, among the power transmission coils, based on the estimated future position; and a decision unit configured to decide whether or not to make the specified power transmission coil actually be in the activated state, based on a signal indicating an operation intention of a driver of the vehicle.

2. The non-contact power supply system according to claim 1, wherein:

the first estimation unit is configured to estimate a predicted course that is a set of the future positions, based on a movement state of the vehicle including the speed; and the specifying unit is configured to specify a power transmission coil that has to be in the activated state, based on the estimated predicted course.

3. The non-contact power supply system according to claim 1, further comprising:

a second estimation unit configured to estimate a position of the vehicle on the road, based on a position in a direction in which the road extends, of one power transmission coil that has supplied electric power to the power receiving coil, among the power transmission coils, and an amount of electric power supplied from the one power transmission coil to the power receiving coil, wherein the first estimation unit estimates the future position, based on the position estimated by the second estimation unit, in addition to the speed.

4. A non-contact power supply system that supplies electric power in a non-contact manner from a plurality of power transmission coils disposed on a road to a power receiving coil mounted on a vehicle traveling on the road, the non-contact power supply system comprising:

a first estimation unit configured to estimate a future position of the vehicle, based on a speed of the vehicle;

a specifying unit configured to specify a power transmission coil that has to be in an activated state that is a state of being able to supply electric power to the power receiving coil, among the power transmission coils, based on the estimated future position; and a coil controller configured to control each of the power transmission coils such that each of the power transmission coils enters the activated state and control each of the power transmission coils such that each of the power transmission coils enters a standby state that is a state where each of the power transmission coils does not supply electric power to the power receiving coil, after each of the power transmission coils enters the activated state, wherein in a case where there is another vehicle that is different from the vehicle and that travels behind the vehicle on the road, the coil controller decides whether or not to extend a period in which the power transmission coil that has entered the activated state due to the vehicle maintains the activated state, based on a position of the other vehicle.

5. The non-contact power supply system according to claim 4, wherein:

the first estimation unit is configured to estimate a predicted course that is a set of the future positions, based on a movement state of the vehicle including the speed; and the specifying unit is configured to specify a power transmission coil that has to be in the activated state, based on the estimated predicted course.

6. The non-contact power supply system according to claim 4, further comprising:

a second estimation unit configured to estimate a position of the vehicle on the road, based on a position in a direction in which the road extends, of one power transmission coil that has supplied electric power to the power receiving coil, among the power transmission coils, and an amount of electric power supplied from the one power transmission coil to the power receiving coil, wherein the first estimation unit estimates the future position, based on the position estimated by the second estimation unit, in addition to the speed.

7. A power reception device that is mounted on a vehicle in a non-contact power supply system that supplies electric power in a non-contact manner from a plurality of power transmission coils disposed on a road to a power receiving coil mounted on the vehicle traveling on the road, the power reception device comprising:

a first estimation unit configured to estimate a future position of the vehicle, based on a speed of the vehicle;

a specifying unit configured to specify a power transmission coil that has to be in an activated state that is a state of being able to supply electric power to the power receiving coil, among the power transmission coils, based on the estimated future position; and a decision unit configured to decide whether or not to make the specified power transmission coil actually be in the activated state, based on a signal indicating an operation intention of a driver of the vehicle.

8. The power reception device according to claim 7, wherein:

the first estimation unit is configured to estimate a predicted course that is a set of the future positions, based on a movement state of the vehicle including the speed; and the specifying unit is configured to specify a power transmission coil that has to be in the activated state, based on the estimated predicted course.

9. The power reception device according to claim 7, further comprising:

a second estimation unit configured to estimate a position of the vehicle on the road, based on a position in a direction in which the road extends, of one power transmission coil that has supplied electric power to the power receiving coil, among the power transmission coils, and an amount of electric power supplied from the one power transmission coil to the power receiving coil, wherein the first estimation unit estimates the future position, based on the position estimated by the second estimation unit, in addition to the speed.

* * * * *